United States Patent [19]
James et al.

[11] Patent Number: 5,127,724
[45] Date of Patent: Jul. 7, 1992

[54] OPTICAL POWER METER

[75] Inventors: Simon M. James, Woodbridge; David A. Ferguson; Dominik Drouet, both of Ipswich; Stephen Hornung, Diss, all of England

[73] Assignee: British Telecommunications, London, England

[21] Appl. No.: 571,629

[22] PCT Filed: Jan. 13, 1989

[86] PCT No.: PCT/GB89/00033
§ 371 Date: Sep. 6, 1990
§ 102(e) Date: Sep. 6, 1990

[87] PCT Pub. No.: WO89/06786
PCT Pub. Date: Jul. 27, 1989

[30] Foreign Application Priority Data

Jan. 13, 1988 [GB] United Kingdom ............... 8800667

[51] Int. Cl.⁵ .................... G01N 21/84; G01J 1/44
[52] U.S. Cl. .................................................. 356/73.1
[58] Field of Search ........................................ 356/73.1

[56] References Cited

U.S. PATENT DOCUMENTS

| | | | |
|---|---|---|---|
| 4,671,653 | 6/1987 | So et al. | 356/73.1 |
| 4,775,233 | 10/1988 | Kaneshi et al. | 356/73.1 |
| 4,830,490 | 5/1989 | Kakii et al. | 356/73.1 |

FOREIGN PATENT DOCUMENTS 2092743  8/1982  United Kingdom ............... 356/73.1

OTHER PUBLICATIONS

Wendland et al., "A Decibel Measuring Instrument For Fiber Optics" Conference: Electro-Optics/Laser International 80 UK, Brighton, England (Mar. 25-27, 1980) pp. 31-37.
*Electronics Letters*, vol. 18, No. 22, Oct. 28, 1982, Y. Kato et al., "New Optical Monitoring Method for Arc-Fusion Splice . . . Loss", pp. 972-973.
*Patent Abstracts of Japan*, vol. 9, No. 221 (P-386)(1944), Sep. 7, 1985 & JP, A, 6079244 (Nippon Denshin Denwa Kosha) May 7, 1985.
*Patent Abstracts of Japan*, vol. 10, No. 72 (P-438)(2129), Mar. 22, 1986 & JP, A, 60211334 (Nippon Denshin Denwa Kosha) Oct. 23, 1985.
*Patent Abstracts of Japan*, vol. 7, No. 278 (P-242)(1423) Dec. 10, 1983 & JP, A, 58154814 (Nippon Denshin Denwa Kosha) Sep. 14, 1983.
*Applied Optics*, vol. 20, No. 3, Feb. 1, 1981, Optical Society of America (New York), Y. Murakami et al., "Coupling Characteristics Measurements Between Curved Waveguides Using a Two-Core Fiber Coupler", pp. 417–422.

*Primary Examiner*—Vincent P. McGraw

[57] ABSTRACT

An optical power meter is used to measure the optical power of optical energy passing along an optical fibre (11). The power meter includes means (12,13) for tapping optical radiation from the optical fibre (11), a transducer (1) for converting the tapped optical radiation into an electrical signal, and means (5,6) for displaying the amplified signal.

15 Claims, 2 Drawing Sheets

OPTICAL POWER METER

FIELD OF THE INVENTION

This invention relates to apparatus for measuring the optical power of optical energy passing along an optical fibre, and in particular to a portable optical power meter.

BACKGROUND OF THE INVENTION

Typically, an optical fibre transmission system includes a plurality of individual transmission paths, each of which is constituted by a plurality of optical fibres connected together (for example by splicing or fusion). Problems arise with the maintenance of such a system, particularly when a given transmission path has an unacceptable power loss. In such a case, it may be necessary to measure the power transmission in a large number of the optical fibres constituting that transmission path. Known optical power meters require a cleaved fibre end for power measurement. This requirement entails not only disruption of the system, but it is time-consuming and requires the use of special tools and a high level of skill by the operator.

There are also known various devices and arrangements which utilise the known fact that if an optical fibre is bent through a sufficiently small radius, light carried by the optical fibre can escape from the fibre where it is bent. In European patent application 0211537A, there is described an improvement of a local launch and detect technique for use in aligning fibres prior to splicing, in which an optical fibre is optically coupled to an optical detector or a light source at the site of a bend in the fibre. The fibre is bent around a curved mandrel and, in the case of optical detection, light emitted from the bent fibre is passed by a resiliently deformable optical coupler, confined by a rigid transparent body, to a detector. Since the primary purpose of the technique is in pre-splice fibre alignment, there is no necessity for the coupling apparatus to exhibit a low insertion loss. Indeed since the coupling apparatus is said to be effective for the local launching of light, it appears likely that it exhibits a high insertion loss, it having been found that tight bending radii are required to permit the local launching of useful levels of light into a clad fibre. Moreover, the inefficiency of the optical coupling of the optical fibre to the detector is such that a small bend radius is needed to ensure detection with a conventional detector. Consequently, such a device would be unsuitable for use on a 'live' fibre in a telecommunications system, where non-intrusive coupling is required. The maximum limit on insertion loss for non-intrusive systems is typically about 3 dB. Devices having insertion losses in excess of this figure may exceed the transmission system's operating margin and hence cause an unacceptable increase in bit rate error.

A further known optical coupling device which uses the bend loss phenomenon is described in Japanese patent application 58-188668. A fibre is again bent around a curved mandrel and emitted light is guided to a detector by means of a plurality of further optical fibres. These further optical fibres are embedded in a block of material against a curved face of which the fibre under test is pressed by the mandrel. The 'collecting' fibres each have an end flush with the curved face of the block and are aligned so that in use they each extend orthogonally from the respective adjacent portion of the surface of the fibre under test. The use of a plurality of 'collecting' fibres is said to lead to efficient detection of the leaked light.

There is again the disadvantage that the fibre under test must be exposed to a small bend radius, since it is only in this way that the requisite levels of emitted light will be coupled into the 'collecting' fibres. Hence it is likely that the insertion loss of this device will also be too high to permit non-intrusive measurements to be made on 'live' fibres. This device also suffers from non-optimum coupling of the test fibre to the detector, necessitating the use of a small bend radius.

SUMMARY OF THE INVENTION

It is an aim of the invention to provide an optical power meter that is easy to operate, which does not require a cleaved end face for power measurement, and which provides good optical coupling to the fibre under test.

A further aim of the invention is to provide an optical power meter which has a low insertion loss.

The present invention provides apparatus for measuring the optical power of optical energy passing along an optical fibre, the apparatus comprising tapping means for tapping optical radiation from the optical fibre, a transducer for converting the tapped optical radiation into an electrical signal, and display means for providing an indication of the magnitude of the electrical signal, the tapping means comprising a pick-up element defining a curved optical waveguiding path, and clamping means for clamping the optical fibre in a curved position which at least substantially conforms to the inner side of the curved path, such that in use optical energy passing along the optical fibre is coupled into the curved optical waveguiding path, wherein the curved optical waveguiding path has a minimum radius of curvature chosen such that measurement of the optical power of optical energy passing along the fibre can be performed without causing an attenuation of said optical energy of more than 3.5 dB.

Preferably, the minimum radius of curvature of the curved optical waveguiding path is 10 mm.

Advantageously, the display means is constituted by a display driver and a multi-segment LED bar display. Conveniently, the driver is calibrated using a known relationship between the amplified electrical signal and the optical power. Preferably, the LED bar display has ten LEDs, and the driver is such that each LED is lit to correspond with a respective 4 dB window of the optical power spectrum of the optical fibre.

Preferably, the transducer is a germanium large area photodiode, and the apparatus further comprises amplifying means for amplifying the electrical signal. The amplifying means may be constituted by a pre-amplifier and a main amplifier. Advantageously, the pre-amplifier is an ultra low noise amplifier, and the apparatus further comprises a log-lin converter for linearising the electrical signal, the converter being positioned between the pre-amplifier and the main amplifier.

Conveniently, the tapping means is mounted in a light-proof casing of two-part construction, the two parts of the casing being relatively movable to permit the insertion of the optical fibre. Preferably, the casing is provided with a handle, and the amplifying means and the display means are mounted in the handle.

BRIEF DESCRIPTION OF THE DRAWING FIGURES

An optical power meter constructed in accordance with the invention will now be described in greater detail, by way of example, with reference to the accompanying drawings, in which.

DETAILED DESCRIPTION OF THE DRAWING FIGURES

Figure 1:
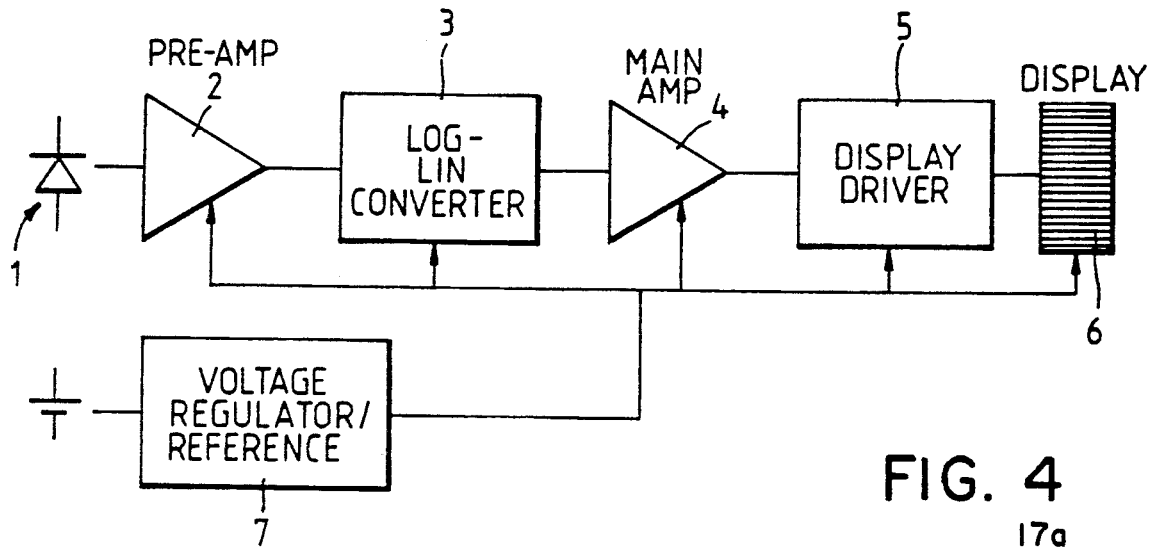
FIG. 1 is a block diagram showing the optical receiver/display driver module of the power meter.

Referring to the drawings, FIG. 1 shows schematically an electronic module forming part of the power meter. The module includes a germanium large area detector (photodiode) 1. The detector 1 has a diameter of 2 mm and is positioned (see below) so as to pick up optical radiation tapped from an optical fibre whose power transmission is to be measured. The responsitivity of the detector 1 is optimised for operation at a wavelength of 1300 nm.

The output of the detector 1 is amplified by a pre-amp 2. The pre-amp 2 is an ultra low noise amplifier, and is located adjacent to the detector 1 to eliminate any stray capacitance effects. The output of the pre-amp 2 then passes to a log-lin converter 3 which linearises the output voltage from the pre-amp (which is directly proportional to the intensity of the optical input) such that the output visual indication is linear with the input optical power (measured in dBm). The output of the converter 3 is further amplified by a main amplifier 4, whose output passes to a display driver 5 which drives a ten segment LED bar display 6. A voltage regulator/reference unit 7 supplied power to all the units 2 to 6. The unit 7 ensures that the power supplied to the system is constant, thereby ensuring accuracy of measurement even when the battery (not shown) associated with the unit 7 has a variable output.

Figure 3:
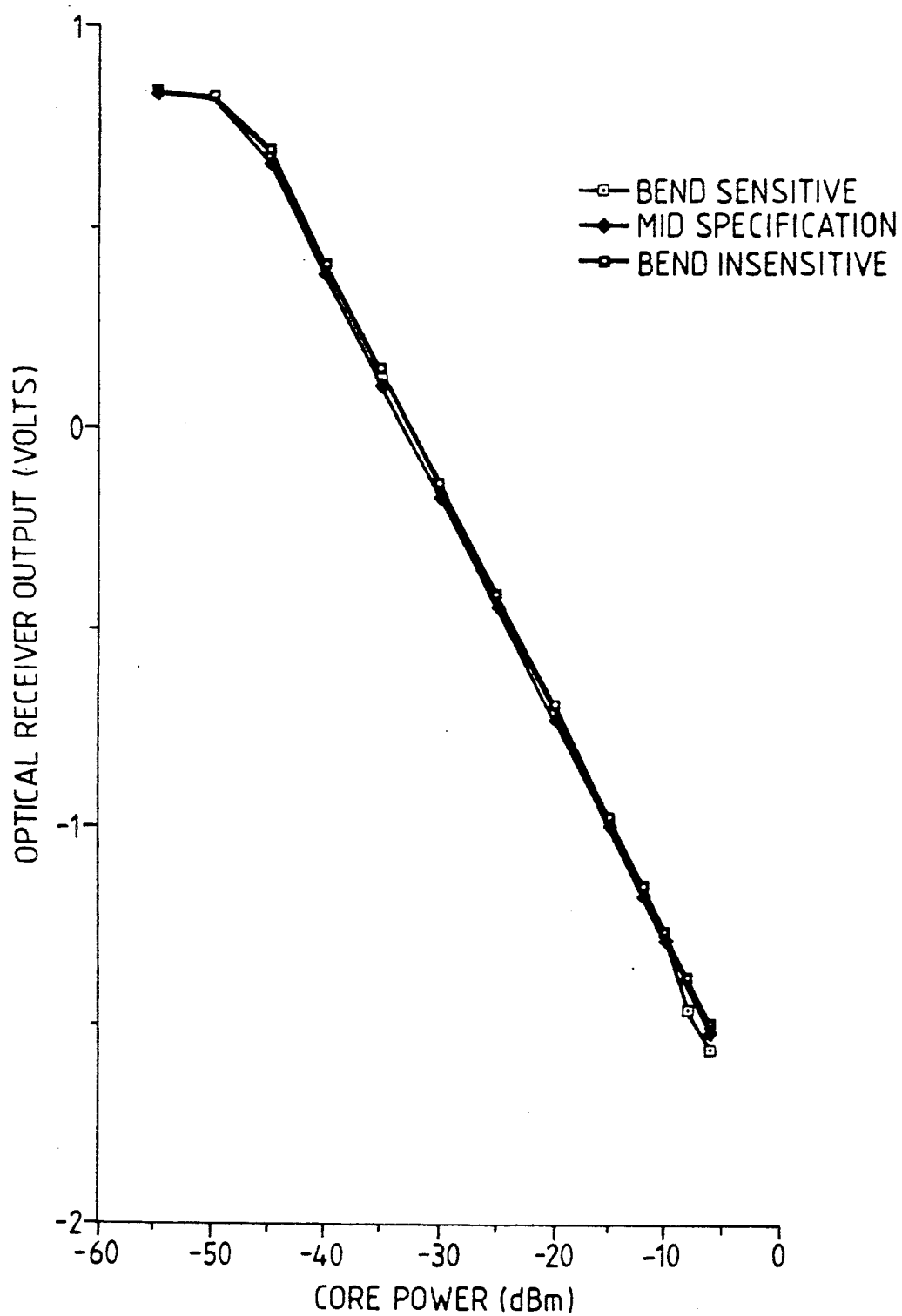
FIG. 3 is a graph showing the power meter response.

FIG. 3 is a graph showing the relationship between the fibre core power and the output voltage of one example of the optical receiver. The graph plots the results for three different fibre specifications, namely bend insensitive, mid specification and bend sensitive. As will be seen, the output from the optical receiver is substantially independent of the specification of the fibre. The main reason for this embodiment of the apparatus being independent of fibre specification is that it offers a high insertion loss to the signal propagating in the fibre core, consequently, the major part of the signal is coupled out of the core, resulting in an accurate, and respectable, optical power measurement. The embodiment used to produce the results used in FIG. 3 is of course intrusive, and as such is not suitable for use on a 'live' fibre. The secondary waveguide 13 of this embodiment has a curved portion having a radius R (to the inner surface 14) of 4 mm. If it is desired to measure optical power levels on 'live' fibres, a non-intrusive power meter is needed. To this end, the radius R should be no less than about 10 mm.

The data from the graph is used to calibrate the display driver 5 in such a manner that the ten LEDs of the LED display 6 each corresponds to a 4 dB window of the fibre core power. The central power level in each window for the three fibre types is shown below.

| LED Glowing | Signal Level in Fibre | | |
|---|---|---|---|
| | Bend Insensitive 1255/8.9 | Mid Spec 1175/9.98 | Bend Sensitive 1119/10.36 |
| 10 | −8 | −7 | −7 |
| 9 | −11 | −12 | −12 |
| 8 | −16 | −16 | −16 |
| 7 | −20 | −20 | −20 |
| 6 | −24 | −24 | −24 |
| 5 | −28 | −28 | −29 |
| 4 | −32 | −32 | −33 |
| 3 | −36 | −36 | −37 |
| 2 | −41 | −41 | −41 |
| 1 | −45 | −45 | −45 |

All signal levels in dBm. Fibre specification figures refer to Cut-off wavelength/Mode Field Diameter.

Figure 2:
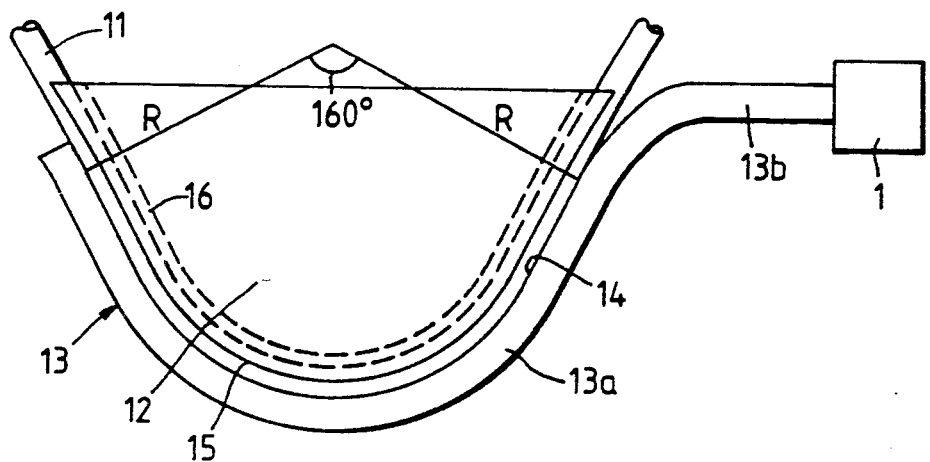
FIG. 2 is a side elevation of the optical coupling device of the power meter.

As mentioned above, the detector 1 picks up optical radiation tapped from an optical fibre whose power transmission is to be measured. FIG. 2 shows an optical coupling device for tapping optical radiation from an optical fibre 11 to the detector 1. The optical coupling device comprises a block 12 and a silica rod 13 having a curved portion 13a and a straight portion 13b. The block 12 and the rod 13 co-operate to clamp the optical fibre 11 against the inner surface 14 of the curved portion 13a. Optical radiation which leaks in use out of the clamped optical fibre 11 is then picked up by the curved portion 13a of the rod 13 and guided to the detector 1. The detector 1 is mounted on the end of the rod 13 adjacent to the straight portion 13b.

The rod 13 has a square cross-section with sides of 2 mm. The curved portion 13a has a substantially constant radius of curvature R (to the inner surface 14) of 4 mm, and subtends an angle of 160° at its centre of curvature. The end of the rod 13 adjacent to the curved portion 13a is polished to give a smooth finish.

The block 12 is made of an optically-opaque plastics material, and has a side elevation which is substantially D-shaped. It is flat-sided, and has a thickness of about 20 mm. The major part of its curved surface 15 is curved to match the shape of the inner surface 14 of the curved portion 13a of the rod 13. The length of the curved surface 15 is greater than that of the rod's inner surface 14, however, so that, when the coupling device is assembled, the block 12 protrudes from the curved portion 13a to rod 13.

The curved surface 15 of the block 12 is provided with a central, V-profile groove 16. The groove 16 is 0.1 mm deep and its sides meet at 60°. This allows it to locate the optical fibre 11 which is a monomode fibre with its primary protective plastics material coating in place, the fibre projecting slightly from the groove 16. Typically such a fibre 11 for use in an optical communications system, will have an outer diameter of about 250 μm.

Means are provided (not shown) for holding the block 12 and the rod 13 together, so that the fibre 11 located in the groove 16 is brought into contact with the inner surface 14 of the curved portion 13a of the rod 13. A simple, spring clip device or the like is suitable for holding the block 12 and the rod 13 together, the force exerted by the device being sufficient to retain the coupling device in an assembled position without causing damage to the protective plastics material coating of the fibre 11. Alternatively, the block 12 and the rod 13 may be pivotally coupled together so that the optical fibre 11 may be gripped between them as in a pair of pliers.

In use, the fibre 11 to be tested is gripped between the block 12 and the curved portion 13a of the rod 13, the fibre lying in the groove 16 of the block 12. The fibre 11 is gripped sufficiently tightly to distort its primary coating slightly, into the groove 16 and against the rod 13. Because the fibre 11 protrudes from the groove 16, the rod 13 is held away from the block 12 by the fibre. This means that the rod 13 is surrounded by air, except where the primary coating of the fibre 11 contacts it. The refractive index of the material of the rod 13 is 1.49. Hence, except where radiation is to be coupled into the rod 13, the rod (in combination with the air) fulfils the criteria of a waveguiding path. That is, together they constitute a core region of one refractive index (the silica rod 13) surrounded by a cladding region of a lower refractive index (the air). Because the difference in refractive indices of the two regions is relatively high, (0.49), the rod 13 is strongly waveguiding, and acts to "capture" a significant proportion of the optical radiation which leaks from the fibre 11.

This type of optical coupling device is described in greater detail in the specification of our co-pending patent application no. 87 06929, the contents of which are incorporated herein by way of reference.

Figure 4:
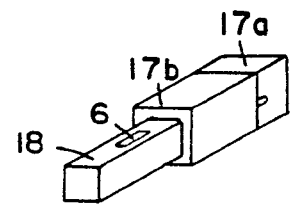
FIG. 4 is a light-proof casing and handle within which the tapping means may be mounted.

The coupling device described above is mounted in a light-proof casing of two-part construction as generally illustrated in FIG. 4, the two parts 17a and 17b of the casing being relatively movable to permit the insertion of the fibre 11. The electronic module including display 6 is conveniently positioned within a handle 18 attached to the casing.

The performance of a non-intrusive version of the power meter, with a 10 mm radius (R) waveguide was compared with that of three proprietary power meters, none of which utilise a secondary waveguide to collect and guide light from the fibre under test to their detectors. The following table gives the average insertion losses of each of the four devices on two fibre types at two wavelengths.

|  | Fibre | Insertion Loss (dB) at 1300 nm | Insertion Loss (dB) at 1550 nm | Mean Sensitivity |
| --- | --- | --- | --- | --- |
| Power Meter according to the invention | D | 0.06 | 3.14 | −30 dBm |
|  | A | 0.04 | 0.34 |  |
| Laser Precision |  |  |  |  |
| AM 3500 | D | 2.1 | 6.6 | −27 dBm |
| AM 4500 | A | 0.7 | 3.1 |  |
| Wilcom | D | 1.4 | 7.1 | −21 dBm |
| OFI 367 | A | 1.1 | 5.3 |  |

The specification of Fibre A was as follows:
Cut-off wavelength 1255 nm, Mode Field Diameter 8.90 ?m. While for Fibre D, the figures are: Cut-off wavelength 1175 nm, Mode Field Diameter 9.95 ?m. These two fibres respectively represent the bend insensitivty and bend sensitive corners of the fibre specification box of British Telecom's Fibre Standard CW 1505E. Both fibres were manufactured by the company Optical Fibres of Deeside.

It will be apparent that the apparatus described above can be used to measure power transmission in optical fibres with the minimum of disruption. In particular, because optical energy is tapped from the fibre whose power transmission is being measured, there is no need for forming cleaved fibre ends. Moreover, the apparatus is easy to use, so can be operated in the field by personnel who may not be highly skilled.

The apparatus described above could be modified in a number of ways. For example, the optical coupling device could be modified so as to tap optical energy travelling along an optical fibre in either direction. In this case, a detector 1 could be provided at each end of the rod 13. Also, in order to minimise variations in power arising from the different effects of bending depending upon fibre specification, the rod 13 could be formed with a more gradual curve. In this case, the apparatus would need further modification, particularly improved amplification. It would also be possible to utilise other forms of display means. For example, the display driver and LED display could be replaced by a suitably calibrated meter having a dial and a movable pointer.

The apparatus would also be modified to operate at a number of different wavelengths. In this case, the electronic module would be modified to include a re-calibration factor to ensure that the apparatus is accurate for a number of different operational wavelengths.

We claim:

1. Portable apparatus for measuring the optical power of optical energy passing along an optical fibre, the apparatus comprising tapping means for tapping optical radiation from the optical fibre, a transducer for converting the tapped optical radiation into an electrical signal, and display means for providing an indication of the magnitude of the electrical signal, said magnitude being indicative of the optical power carried by the fibre, the tapping means comprising a pick-up element defining a curved optical waveguiding path, and clamping means for clamping the optical fibre with sufficient force to retain the optical fibre in a curved position which at least substantially conforms to the inner side of the curved path, such that in use optical energy passing along the optical fibre is coupled into the curved optical waveguiding path, wherein the curved optical waveguiding path has a minimum radius of curvature chosen such that measurement of the optical power of optical energy passing along the fibre can be performed without causing an attenuation of said optical energy of more than 3.5 dB.

2. Apparatus as claimed in claim 1, wherein the minimum radius of curvature of the curved optical waveguiding path is 10 mm.

3. Apparatus as claimed in claim 1, wherein said attenuation is measured at 1550 nm.

4. Apparatus as claimed in claim 1, wherein said optical fibre is a silica fibre having a cut-off wavelength of 1175 nm and a mode field diameter of 9.95 μm.

5. Apparatus as claimed in claim 1, wherein the pick-up element has a curved portion and a straight portion, the curved portion defining the curved optical waveguiding path, and the straight portion constituting a straight waveguiding path for directing tapped optical energy to the transducer.

6. Apparatus as claimed in claim 1, wherein the display means is constituted by a display driver and a multi-segment LED bar display.

7. Apparatus as claim in claim 6, wherein the driver is calibrated using a known relationship between the amplified electrical signal and the optical power.

8. Apparatus as claimed in claim 6, wherein the LED bar display has ten LEDs, and the driver is such that each LED is lit to correspond with a respective 4 dB window of the optical power spectrum of the optical fibre.

9. Apparatus as claimed in claim 1, wherein the transducer is a germanium large area photodiode.

10. Apparatus as claimed in claim 1, further comprising amplifying means for amplifying the electrical signal.

11. Apparatus as claimed in claim 10, wherein the amplifying means is constituted by a pre-amplifier and a main amplifier.

12. Apparatus as claimed in claim 11, wherein the pre-amplifier is an ultra low noise amplifier.

13. Apparatus as claimed in claim 11, further comprising a log-lin converter for linearising the electrical signal, the converter being positioned between the pre-amplifier and the main amplifier.

14. Apparatus as claimed in claim 1, wherein the tapping means in mounted in a light-proof casing of two-part construction, the two parts of the casing being relatively movable to permit the insertion of the optical fibre.

15. Apparatus as claimed in claim 14, wherein the casing is provided with a handle and the amplifying means and the display means are mounted in the handle.

* * * * *